March 29, 1960 R. S. WILLIAMS 2,930,455
DAMPING DEVICES
Filed Dec. 11, 1956
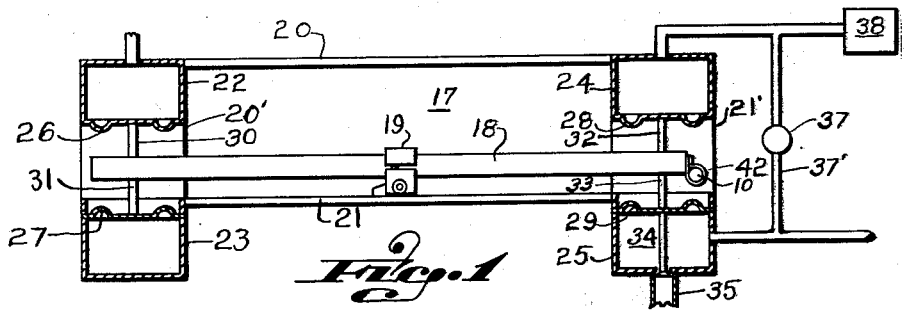
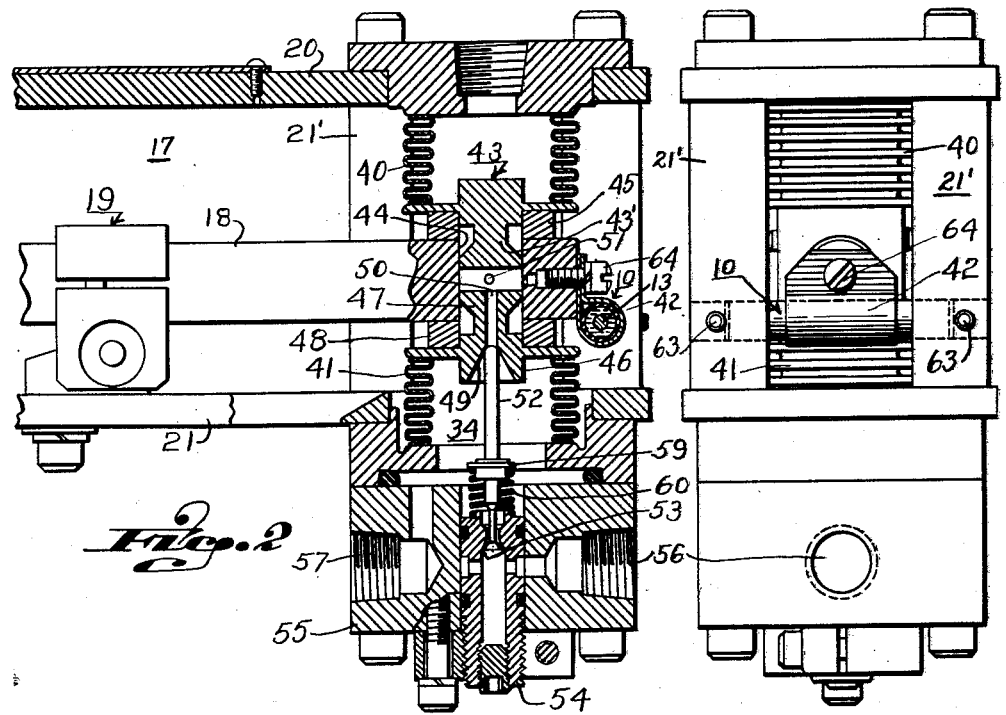
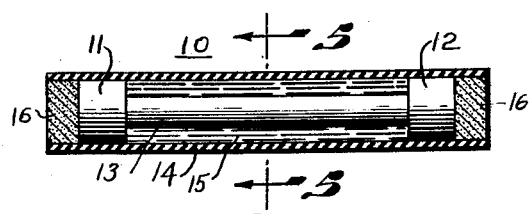
INVENTOR.
Roy S. Williams
BY Gerald B. Tjoflat
His attorney

United States Patent Office 2,930,455
Patented Mar. 29, 1960

2,930,455

DAMPING DEVICES

Ray S. Williams, Orrville, Ohio, assignor to Hagan Chemicals & Controls, Inc., a corporation of Pennsylvania Application December 11, 1956, Serial No. 627,639

4 Claims. (Cl. 188—87)

This invention relates to damping devices.

In certain pneumatic relays, totalizers and similar devices embodying springs, diaphragms and valves for controlling the transmission of output pressures which are utilized for controlling purposes and which are also utilized to load one or more of the diaphragms, there are strong tendencies for vibrations to develop which interfere with the operation of the valves and the accuracy of the output pressures. Damping of these devices has long been a problem. Oil dash pots comprising a cup and piston have been utilized with satisfactory results in certain cases. However, since the oil dash pot dampers can only be mounted in a fixed position, otherwise the oil would be spilled out, devices to which they have been applied also had to be mounted in a fixed position.

When devices damped with oil dash pots were used on shipboard for example, the rocking and rolling of the ships would often be so great as to spill the oil. Such an occurrence renders the dash pot useless and also produces a fire hazard.

An object of this invention is to provide a viscous damping device from which the damping liquid cannot be spilled regardless of the position in which it is placed and which will perform its intended function in all possible positions which the device damped thereby might assume.

Another object is to provide a damper in which the damping liquid is sealed, and that comprises a minimum number of parts, is easily manufactured and assembled and relatively inexpensive.

A further object is to provide a damping device comprising an outer flexible tubular member composed of an elastomer and a rigid member within the same, the end portions of the rigid member being of such diameter that the end portions of the tubular member will form a liquid-tight seal therewith, the intervening portion of the rigid member being of such smaller diameter that an annular space is formed between the flexible tubular member and said intervening portion to accommodate the damping liquid.

An elastomer is defined as a rubber-like substance that can be stretched from at least twice to several times its original length and upon release of the stress returns rather rapidly almost to its original length. The Encyclopedia of Chemistry, page 331, by George L. Clark and Gessner G. Hawley, 1957, published by Rheinhold.

The above and other objects of the invention will be apparent to those of ordinary skill in the art to which the invention pertains from the following description, the accompanying drawings and the appended claims.

In the drawings:

Figure 1 is a more or less diagrammatic view of a pneumatic totalizer having a fulcrumed beam and a damping device embodying a form of the invention;

Fig. 2 is an enlarged view in section of one end of a commercial device embodying the features of the schematic device of Fig. 1;

Fig. 3 is a view in end elevation of the device of Fig. 2, showing the damping device in position;

Fig. 4 is a view in longitudinal section of the damping device embodied in the devices of Figs. 1, 2 and 3; and Fig. 5 is a view in section taken on line 5—5 of Fig. 4.

The damping device 10 as shown in Figs. 4 and 5 embodies what now appears to be a preferred form of the invention. It comprises a rigid member having enlargements 11 and 12 connected by a spindle or link 13, a flexible tubular member 14 within which the rigid member is encased and a viscous fluid 15 contained within the annular space between link 13 and the inner surface of member 14. The end portions of member 14 tightly grip the enlargements 11 and 12 and a form sealed joints therewith.

Member 14 may be composed of any suitable elastomer such as rubber, natural or synthetic, or a material known as "Tygon," or other suitable flexible material. If rubber is used, a cement is not required to form a liquid-tight seal at the enlargements 11 and 12. If a material such as "Tygon" is used, the joint between the enlargements and member 14 may be sealed with a solvent type cement such as cyclohexanone containing about 5% by weight of "Tygon." The space at the outer ends of the member 14 may be filled with suitable plugs 16 as shown.

Before sealing the member 14 to the enlargements 11 and 12, the space between the portion 13 and the inner wall of member 14 which embraces the same, is so completely filled with a viscous liquid that no air bubbles are trapped therein. The damping liquid should be one whose viscosity is substantially constant over the temperature range to which the damping device will be exposed in operation. A viscous liquid suitable for the purpose may be a silicone oil.

A practical application of the damping device is shown by the schematic view of Fig. 1 where it is embodied in a pneumatic totalizer 17. Totalizer 17 comprises a beam 18 mounted on a fulcrum 19 which is supported by a rigid frame composed of members 20 and 21 and end members 20' and 21'. Device 17 also comprises diaphragm chambers 22, 23 and 24, 25, located at the opposite ends of the beam. Chambers 22, 23 and 24, 25 are provided with flexible members such as diaphragms 26, 27, 28 and 29, respectively. These flexible members are coupled to the beam by rigid members 30, 31, 32 and 33, respectively.

Chambers 22, 23 and 24 may receive loading pressures of varying magnitude which develop turning moments about the fulcrum, the algebraic sum of which is balanced by a turning moment developed by pressure in chamber 25. The pressure in chamber 25 is regulated by a valve assembly 34 shown in detail in Fig. 2. Valve assembly 34 controls the admission of compressed air from a source of supply at a predetermined constant value. The supply is connected to an inlet 35. Clockwise motion of beam 18 opens the valve and admits pressure to chamber 25 until that pressure acting on its diaphragm develops a force sufficient to balance the torque forces exerted by one or more of the other diaphragms on the beam.

The pressure developed in chamber 25 may be utilized for regulating purposes and it may also be utilized for loading the diaphragm in chamber 24 so as to provide automatic feedback. Rate action may be obtained by using a needle valve 37 in the connection 37' to chamber 24 and a volume chamber 38 in the connection 37' between the needle valve and the chamber 24.

As stated supra, when beam 18 tilts clockwise about its fulcrum, the pressure in chamber 25 increases. When the beam tilts counterclockwise the inlet of the valve is closed and an exhaust port in the assembly of diaphragm 29 is opened thereby exhausting pressure to the atmosphere until there is balance between the moments of the forces acting on the beam at which time the valve assembly will be closed, that is, both the inlet and the exhaust ports will be covered.

In Fig. 2 bellows 40 and 41 are utilized in lieu of diaphragms 28 and 29 of Fig. 1. These bellows form the flexible elements of the diaphragm chambers 24 and 25.

As shown in Fig. 1 the opposite ends of damping device 10 are rigidly secured to the frame of the totalizer while the central portion of the flexible member 14 is secured by a clamp 42 to the end of the beam 18. Thus, as the beam moves, the wall of member 14 is flexed—one side of the wall moving towards the spindle or link portion 13, while the opposite side moves away from it—whereby liquid is displaced through the space about the spindle. When the beam moves slowly, little damping action is developed, but when the motion is relatively rapid and reversing, the damping action is ample and prevents vibration of the beam and diaphragm 29 which in the absence of the damping device might reach a "buzzing" pitch.

With reference to Fig. 2, the lower end of bellows 40 is sealed to a thrust member 43 having a depending portion 43' that is received in a transverse aperture 44 in the beam 18. The thrust member 43 may rest on a spacer ring 45 embracing the aperture 44. Thus any forces developed by pressure in the chamber of bellows 40 is transmitted downwardly against the beam 18.

The bellows 41 is sealed to a thrust member 46 having a portion 47 extending into the transverse aperture 44. This member also may act through a spacer 48 on the beam 18.

The thrust member 46 forms part of the valve assembly 34 in that it is provided with an exhaust port recess 49 of conical form having an exhaust passageway 50 leading to the atmosphere through a port 51 in the beam. The valve assembly includes a valve 52, one end of which controls the exhaust port 49 while the other end controls an inlet port seat 53 formed in a valve body 54 that is screwed into a bonnet 55. The bonnet 55 includes an inlet port 56 to which a source of supply of air pressure at constant value may be connected, and an outlet port 57 that communicates with the chamber formed by the bellows 41.

The valve stem 52 is provided with a thrust collar 59 and a spring 60 that is disposed between the collar and the inner end of the valve body 54. Thus the spring 60 tends to urge the valve in a direction in which the inlet port seat is closed.

When beam 18 turns clockwise about its fulcrum 19, the thrust member 46 pushes the valve stem 52 in a direction to open the inlet port 53 thereby admitting pressure from the inlet 56 to the interior of the chamber formed by the bellows 41. As that pressure increases, a force is developed that resists the forces tending to turn the beam 18 clockwise. When the pressure has developed to a value where moments of the clockwise forces are equalized, the beam comes to a neutral position. In that position both the inlet and the exhaust ports of the valve assembly are closed.

If the clockwise forces decrease, the force of the pressure within the bellows 41 causes the beam 18 to turn counterclockwise whereupon the exhaust port is uncovered and pressure within the bellows is exhausted to the atmosphere through the ports 50 and 51, as above explained, until the moment of the force exerted by bellows 41 is in equilibrium with the moments of the other forces acting on the beam.

The damping device 10 as shown in Figs. 2 and 3 is secured at its ends to the frame members 21' of the device and may be locked in position by means of set screws 63. The central portion of the device is embraced by the clamp 42. The clamp is secured by a screw 64 to the right-hand end of beam 18.

As stated supra, a device embodying diaphragms and springs and in which the diaphragms are subjected varying pressures, may at various operating pressures develop vibrations which if not damped would render the pressures developed by the valve assembly 34 inaccurate and the device as a whole at times quite useless. Since the damping device 10 acts on the beam 18, which is movable relative to the fixed ends of the damping device, the portion of the member 14 of device 10 located between the enlargements 11 and 12, deflects thereby displacing liquid through the annular space between the portion 13 and the surrounding portion of the member 14. The liquid is displaced in the direction in which the beam moves. Consequently, while the wall of member 14 on one side of the rigid member moves toward the spindle 13, the portion of the wall directly opposite will move away from it in order to provide space for the liquid displaced.

The damping device 10 is one which can be mounted in any position because the damping liquid cannot escape or be spilled out. Therefore, the device of Figs. 2 and 3 and of Fig. 1 may be mounted in a horizontal position or in a vertical position or at any angular position without in any way endangering the spillage of damping liquid from the damping device. The damping device therefore overcomes the objections stated supra and makes it possible to use that damping device on shipboard or other places where it is important that the device operate in all positions without spillage of oil. Thus fire hazards are absent.

Having thus described the invention, it will be apparent to those skilled in the art to which the invention pertains, that various modifications and changes may be made in the illustrated embodiment without departing from either the spirit or the scope thereof.

Therefore, what is claimed as new and desired to be secured by Letters Patent is:

1. A viscous damping device comprising an elongated flexible tubular member having a central interior portion of substantially uniform diameter, an elongated generally rigid member disposed within the flexible tubular member longitudinally thereof, said rigid member having terminal portions and an intermediate central cylindrical portion of reduced diameter less than the diameter of the central interior portion of the tubular member, the terminal portions of the rigid member each having an annular portion surrounding and facing the central portion of reduced diameter, said terminal portions of the rigid member being fitted snugly within the end portions of the tubular member, means securing the adjacent ends of the tubular member and of the rigid member together in liquid-tight immobile relation, there being an unobstructed annular chamber of substantially uniform cross section within the tubular member formed by the inner wall of said tubular member, the reduced cylindrical portion of the rigid member and the annular portions of the terminal portions thereof, and a viscous damping liquid filling said annular chamber whereby relative lateral displacement of the wall of the tubular member with respect to the reduced central portion of the rigid member transversely of the longitudinal axis of the device is resisted by the displacement of said liquid within said annular chamber.

2. A viscous damping device according to claim 1 in which the flexible member is composed of an elastomer.

3. The combination with the device having relatively fixed and movable members subject to vibration, of a cylindrical cartridge damping device having its longitudinal axis disposed at right angles to the direction of motion between said relatively fixed and movable members and secured at its ends to one of said relatively movable members and at its middle portion to the other of said relatively movable members, said damping device comprising a flexible tubular member having a central interior portion of substantially uniform diameter and a rigid member extending through the tubular member, the ends of said rigid member being fitted snugly within the ends of the tubular member, means securing the adjacent ends of the tubular member and rigid member in liquid-tight immobile relation, the portion of the rigid member intermediate the ends thereof being generally cylindrical and of reduced diameter and smaller than the internal diameter of the flexible member, there being an unobstructed annular space of substantially uniform cross section within the tubular member between the enlarged ends of the rigid member and surrounding the intermediate cylindrical portion of reduced diameter thereof and formed in part by the inner wall of the tubular member, and a damping liquid filling said annular space whereby movement between the relatively fixed and movable members at right angles to the longitudinal axis of the device tends to displace the rigid member with respect to the walls of the tubular member and this displacement is resisted by the flow of liquid within the annular chamber.

4. A device as in claim 3 in which the flexible member is composed of an elastomer.

References Cited in the file of this patent

UNITED STATES PATENTS

| | | |
|---|---|---|
| 729,014 | Thornton | May 26, 1903 |
| 1,304,311 | Heldrich | May 20, 1919 |
| 1,941,989 | Larsen | Jan. 2, 1934 |
| 2,503,143 | Wasdell | Apr. 4, 1950 |
| 2,581,528 | Griswold et al. | Jan. 8, 1952 |
| 2,606,631 | Grooms | Aug. 12, 1952 |
| 2,636,790 | McNally | Apr. 28, 1953 |

FOREIGN PATENTS

| | | |
|---|---|---|
| 202,316 | Australia | June 27, 1956 |
| 1,128,974 | France | Sept. 3, 1956 |
| 255,872 | Great Britain | Feb. 10, 1927 |